Aug. 24, 1965 W. G. LOVELL 3,202,141
METHOD OF OPERATING COMPRESSION IGNITION ENGINE
Original Filed Oct. 27, 1961
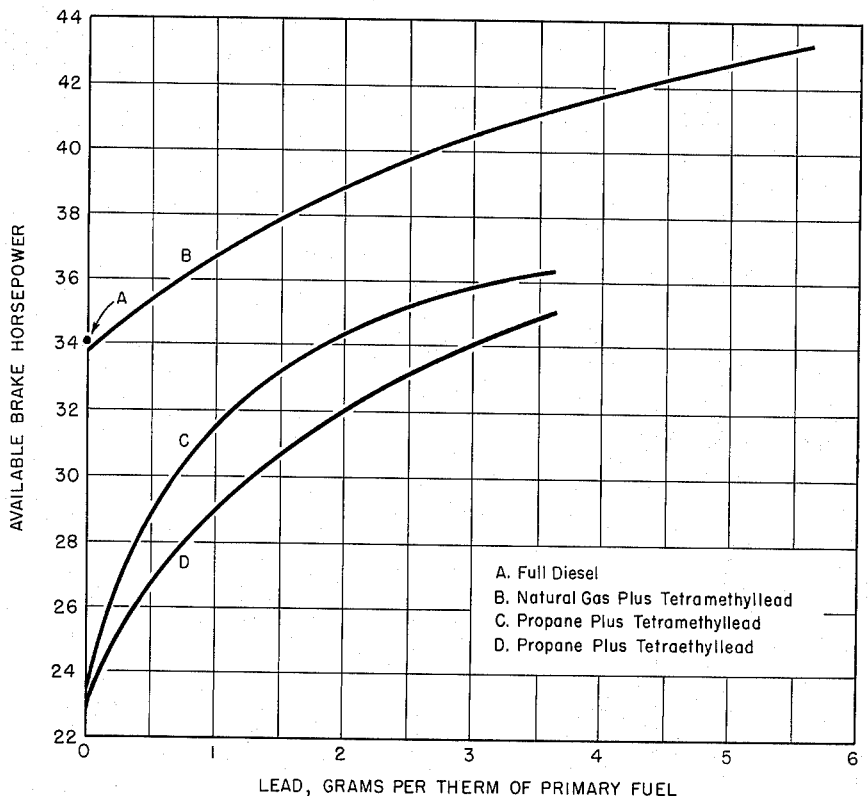
INVENTOR.
WHEELER G. LOVELL

United States Patent Office 3,202,141
Patented Aug. 24, 1965

3,202,141
METHOD OF OPERATING COMPRESSION
IGNITION ENGINE
Wheeler G. Lovell, Bloomfield, Mich., assignor to Ethyl Corporation, New York, N.Y., a corporation of Virginia
Continuation of application Ser. No. 148,277, Oct. 27, 1961. This application July 1, 1963, Ser. No. 295,585
6 Claims. (Cl. 123—1)

This application is a continuation of application serial No. 148,277, filed October 27, 1961, which, in turn, is a continuation-in-part of pending applications Serial Numbers 11,416 and 11,417, both filed February 29, 1960, all of which are abandoned.

This invention relates to a method of operating an internal combustion engine. More particularly, the invention relates to an efficient and economical operation of diesel engines adapted to operate on a dual fuel cycle.

For the purpose of this invention, dual fuel engines are defined as compression ignition engines which use as a portion of the fuel supply, a normally gaseous material (hereinafter also referred to as the primary fuel) such as natural gas, liquefied petroleum gas, methane, ethane, propane, etc. Ignition of the gaseous primary fuel is accomplished by the injection of a charge of diesel fuel (hereinafter also referred to as pilot charge) into the compressed gas mixture. Thus, normal dual fuel operation comprises induction of a primary fuel-air mixture into the combustion chamber, compressing this mixture by means of the compression stroke, and at some point during the compression stroke, injecting a pilot charge of diesel fuel into the compressed primary fuel-air mixture. The pilot charge of diesel fuel is injected through a conventional diesel fuel injection system and acts as a source of ignition for the compressed fuel-air mixture. In normal dual fuel operation, air to the engine is not throttled but is constant. Power output from the engine is controlled by varying the amount of gaseous fuel admitted into the combustion chamber. For a given engine, the quantity of the pilot charge of diesel fuel per cycle is usually fixed, regardless of engine output. At full load the amount of the pilot charge usually represents less than 10 percent of the total fuel to the engine.

One of the main incentives for using a dual fuel cycle is economy. Many widely available gaseous fuels are much cheaper than conventional diesel fuel. Moreover, using gaseous fuels allows smoother, cleaner combustion with a minimum of combustion chamber deposits. Engine maintenance costs are reduced and engine life is prolonged.

In many instances operating a compression ignition engine on the dual fuel cycle results in a severe penalty, for only a fraction of maximum power is available as compared with operating the engine as a full diesel. The sharp reduction in power output is due to a loss of combustion control. This loss of combustion control is evidenced by rough operation, audible noises, combustion knock, etc. This is very objectionable for it results in shock loading of pistons, bearings, and other engine parts as well as loss in power output. To avoid this loss of combustion control, engine manufacturers have had to limit the power output of the engine. This is accomplished by reducing the amount of primary fuel introduced into the combustion chamber during each cycle which in turn results in lower power output.

The fact that the use of certain gaseous fuels in a dual fuel operation results in loss of combustion control has long been recognized. As far back as 1898, Rudolph Diesel recognized this problem. In his British Patent No. 7,657 claiming the method of operating an internal combustion engine on a dual fuel cycle, he stated that he could use "illuminating gas . . . however only in small proportion to the air." In other words the amount of fuel had to be reduced or limited to retain combustion control. Thus, for a period of over 60 years, this problem of loss of combustion control when using a dual fuel cycle has plagued the industry. The problem has not been solved but only circumvented by accepting the penalty of limiting the power output of the engine to avoid the problems associated with combustion control loss.

It is an object of this invention to provide a method of operating a dual fuel engine in an economical and efficient manner. Another object is to provide a method whereby the power output available from a dual fuel engine is equal to or greater than the maximum power available when operating under full diesel conditions.

It has now been found that surprisingly, a material normally used as an antiknock agent in gasoline fuels for spark-ignited engines can be used as a combustion control improver in compression ignition engines operated on a dual fuel cycle. Accordingly, the objects of this invention are accomplished by the method of this invention which method comprises the steps of:

(1) Introducing into the combustion chamber of a compression ignition engine a gaseous fuel, an organometallic combustion control additive, and air to form a combustible mixture, said combustion control additive being present in an amount such that the metal is present in a concentration of from 0.001 to about 0.5 weight percent based on the weight of said gaseous fuel, (2) Compressing said mixture to about from $\frac{1}{12}$ to about $\frac{1}{22}$ of its original volume so as to be at a temperature sufficient to ignite diesel fuel, (3) Injecting into the combustion chamber a pilot charge of diesel fuel so as to initiate combustion of the total mixture, the weight ratio of said pilot charge to said gaseous fuel being from about 0.01:1 to about 1:1, said pilot charge optionally containing from about 0.001 to about 1 percent of combustion control additive.

The combustion control additives of this invention comprise compounds selected from the group consisting of organo-lead compounds and a hydrocarbon soluble organometallic compound of a metal of atomic number 25–28 inclusive.

The above-enumerated combustion control additives may be added singly or in any combination to the gaseous primary fuel-air mixture. In some situations, it is also desirable to add a combustion control additive to the diesel pilot charge. In any event, in the practice of this invention, a combustion control additive as described above must be present in the gaseous primary fuel-air mixture. In a preferred method, a relatively volatile additive is added to the gaseous primary fuel and a second, heavier additive which may produce a synergistic effect is added to the diesel pilot charge. A specific example is to add tetramethyllead to the primary fuel and methylcyclopentadienyl manganese tricarbonyl to the pilot charge.

The inclusion of a material normally used as an antiknock material in the gaseous primary fuel permits much greater power to be developed than heretofore possible. By the use of the method of this invention, combustion control is retained, allowing operation of the dual fuel engine in a manner so as to obtain as much and oftentimes more power than that possible when operating the engine as a full diesel. This is surprising for the art has long recognized that organometallic antiknock materials such as tetramethyllead, although useful in gasoline fuels used for spark-ignited engines, were not useful but in some respects even harmful when included in diesel fuel. In order to understand the import of this statement, it is necessary to consider the diesel combustion process.

In diesel operation combustion control is mainly obtained by the rate at which diesel fuel is injected into hot, compressed air. The fuel particles, upon contact with the high-temperature air within the combustion chamber, do not ignite instantaneously but there is a "delay period" of several thousandths of a second between the start of fuel injection and the time that the fuel particles are ignited. Burning then proceeds in a manner determined by the rate and the total quantity of fuel injected into the air charge. Under proper conditions, the burning produces a smooth, even pressure rise in the combustion chamber. The ignition delay period is critical, for if the fuel does not ignite within the proper interval, too large an amount of fuel will have been mixed with the air charge. When ignition does take place, the larger amount of fuel will burn in a relatively short time, resulting in an abnormal, high rate of pressure rise. A long ignition delay period also allows time for pre-flame reactions to take place in the fuel-air mixture before ignition occurs and the reactions result in products which burn with extreme rapidity, further contributing to the excessive, rapid pressure rise. The rate of pressure rise may become so rapid that rough engine operation, evidenced by loss of power, combustion knock, etc. will occur. Also with a cold engine and with low intake air temperatures, too long a delay period produces misfiring and uneven or incomplete combustion with consequent smoke and loss of power.

With a proper ignition delay period, ignition occurs before the pre-flame reactions have proceeded and when the proper amount of fuel has been injected into the air charge, producing a smooth, gradual pressure rise.

The ignition delay period is associated with the chemical composition of the fuel. Ignition delay characteristics are so important that diesel fuel specifications almost universally include an ignition delay characteristic. In an engine test procedure under ASTM Designation D-613-48T, the ignition delay characteristics of the diesel fuel are compared with those of two pure hydrocarbon reference fuels, cetane and α-methylnaphthalene. Cetane has a very high ignition quality (short ignition delay period) and, accordingly, is designated at the top of the scale with a cetane number of 100. α-Methylnaphthalene has an exceedingly low ignition quality (long ignition delay period) and represents the bottom of the scale with a cetane number of zero. Blends of these two hydrocarbons represent intermediate ignition qualities and their cetane number is the percentage of cetane in the blend. The ignition delay characteristics of the diesel fuel are matched with those of the blend and a cetane number is accordingly assigned to the diesel fuel.

With spark-ignited internal combustion engines, the primary fuel characteristic is octane number. This is the measure of the ability of a fuel to resist pre-spark or uncontrolled and erratic combustion. As with diesel fuel, the end objective is to control combustion so as to obtain a smooth, even pressure rise. The term designating this quality is known as octane number. The resistance of the fuel to pre-flame combustion, uncontrolled combustion, etc. usually known as knock, is compared with that of isooctane, the top of the scale, and n-heptane, the bottom of the scale. A single-cylinder engine is operated in accordance with the standard ASTM procedure and the antiknock quality of the fuel is matched with that of a blend of isooctane and heptane. The percentage of isooctane in the blend having the same antiknock properties as those of the fuel is assigned as the fuel octane number. The higher the octane number the more desirable the fuel.

Thus, with normal diesel fuel operation, in order to retain combustion control, the desirable fuel quality is ability to ignite within a fairly short time, whereas with spark-ignited engines the desirable fuel quality is ability to resist combustion until ignited by the spark. From these considerations it would be expected, and the art recognizes, that a good diesel fuel would make a poor fuel for spark-ignited engines and vice-versa. This is verified from the literature. "Knock Characteristics of Hydrocarbons," by W. G. Lovell, published in "Industrial and Engineering Chemistry," vol. 40, No. 12, December 1948, presents research octane numbers for a variety of pure hydrocarbons. "Combustion Characteristics of Compression Ignition Engine Fuel Components," by D. R. Olsen et al., presented at the SAE National Fuels and Lubricants meeting, November 2, 1960, Tulsa, Oklahoma, reports cetane numbers for various hydrocarbons. Cetane numbers and octane numbers for pure hydrocarbons common to both of the aforementioned papers are presented in Table I.

TABLE I

*Octane and cetane number comparison*

| Hydrocarbon | Cetane Number [1] | Octane Number |
|---|---|---|
| Heptane | 41 | 0 |
| 2-octene | 39.2 | 56.3 |
| n-Hexane | 39 | 24.8 |
| 1-hexene | 36.1 | 76.4 |
| Cyclohexane | 34.2 | 83 |
| 2,2,4-trimethylpentane | 33.7 | 100 |
| Ethyl benzene | 31.5 | 107.4 |
| Toluene | 31.3 | 120.1 |

[1] Cetane numbers were determined for the indicated hydrocarbon in a concentration of 20 percent in a base fuel composed of 25 percent n-cetane and 75 percent isooctane. The base fuel ha ad cetane number of 38.

The data of the above table clearly demonstrate that fuels most suited for diesel operation are the least desirable for spark ignition operation. Heptane, which has the highest cetane number of the materials shown, has the lowest octane number. Conversely, toluene, which has the lowest cetane number, has an exceedingly high octane number.

The effect of including organometallic antiknock compounds in diesel fuels is shown in Table II. Methylcyclopentadienyl manganese tricarbonyl and tetraethyllead (TEL), materials used in commercial fuels for spark ignition engines, were added to several different diesel fuels and the cetane number was determined in accordance with ASTM Test Designation D-613-48T.

TABLE II

*Effect of organometallic antiknock compounds on diesel fuel cetane number*

| | Cetane Number | | | |
|---|---|---|---|---|
| | Mn, gm./gal. as methylcyclopentadienyl manganese tricarbonyl | | | |
| | 0.0 | 0.02 | 0.04 | 0.08 |
| Fuel 1 | 53.8 | 53.1 | 52.6 | 52.0 |
| Fuel 2 | 49.6 | 48.6 | 47.9 | 47.1 |
| Fuel 3 | 55.9 | 53.4 | 53.2 | 51.9 |
| Fuel 4 | 43.5 | 43.0 | 41.5 | |

| | Tetraethyllead, Wt. Percent | | | | | |
|---|---|---|---|---|---|---|
| | 0.0 | 0.1 | 0.25 | 0.50 | 1.0 | 2.0 |
| Fuel 5 | 33.0 | 27.2 | 24.4 | 23.0 | 21.2 | 20.0 |

Thus, methylcyclopentadienyl manganese tricarbonyl and tetraethyllead, although widely used to improve the combustion properties of gasoline, have an opposite and adverse effect on cetane number of diesel fuel.

The data of Tables I and II thus amply demonstrate what is well known to those skilled in the art—that spark ignition engines and compression ignition engines are opposites; that cetane numbers and octane numbers bear an inverse relationship; and that the most desirable fuels for efficient operation of spark-ignited engines are the least desirable for efficient operation of diesel engines. This is true whether the cetane numbers and octane numbers are due to the inherent properties of the hydrocarbon constituents or due to the addition of chemical additives. In other words, it has been well known that those hydrocarbon components and chemical additives which produce a beneficial effect in gasoline-type fuels produce an adverse affect with respect to combustion control when included in diesel fuels. Contrary to the teachings of the prior art, it has now been discovered that materials normally used for antiknock purposes in gasoline can be used as combustion control improvers to markedly increase the power output of a compression ignition engine operated on a dual fuel cycle. In short, contrary to prior art teachings, primary fuels of lower cetane numbers are desirable for maximum power output of a dual fuel compression ignition engine.

Among the combustion control improvers usable in the method of this invention are lead alkyls wherein each alkyl group contains up to about 6 carbon atoms and includes compounds such as tetramethyllead, tetraethyllead, tetraisopropyllead, tetrapropyllead, tetrabutyllead, tetraamyllead, tetraoctyllead, dimethyldiethyllead, hexyltriethyllead methyltriethyllead and the like. The phenyl and mixed phenylalkyl compounds such as tetraphenyl, trimethylphenyl, diphenyldiethyl, triphenylpropyl, etc. are also useable.

Also included within the scope of the combustion control improvers of this invention are organic compounds of a metal having an atomic number of from 25-28, said compounds characterized by being covalent, by possessing in addition to the said metal only elements selected from the class consisting of carbon, oxygen, hydrogen and nitrogen, by containing at least one group selected from the class consisting of cyclopentadienyl groups and the carbonyl group, and by containing from 5 to 20 carbon atoms in the molecule. The metals of atomic numbers 25-28 are manganese, iron, cobalt and nickel.

The preferred manganese compounds are the cyclopentadienyl manganese tricarbonyls as described for example in U.S. Patents 2,818,416 and 2,818,417. Illustrative of these compounds are cyclopentadienyl manganese tricarbonyl; methylcyclopentadienyl manganese tricarbonyl; indenyl manganese tricarbonyl; manganese pentacarbonyl; and so on.

The preferred nickel compounds are of the type as described in U.S. Patent 2,818,416. These include cyclopentadienyl nickel nitrosyl; methylcyclopentadienyl nickel nitrosyl; indenyl nickel nitrosyl and the like.

The preferred iron compounds of this invention are the di-cyclopentadienyl iron compounds; e.g., bis-cyclopentadienyl iron; bis-methylcyclopentadienyl iron; bis-butyl-cyclopentadienyl iron. Other compounds such as iron pentacarbonyl and butadiene iron tricarbonyl are also effective.

The preferred cobalt compounds include the cobalt carbonyls such as cobalt tetracarbonyl; cyclopentadienyl cobalt dicarbonyl; 1-pentyne-cobalt tetracarbonyl and cobalt pentacarbonyl mixed complexes.

The preferred concentration range for the combustion control improvers is from about 0.03 to about 0.25 percent metal based on the weight of the primary gaseous fuel. At these concentrations the additives are extremely effective on a cost-effectiveness basis. When also included in the diesel fuel pilot charge, the preferred metal concentration is from about 0.05 to about 0.4 weight percent of the diesel fuel.

The most preferred organometallic compound is tetramethyllead. This material is extremely effective in increasing the maximum power output of a dual fuel engine and furthermore is the most volatile and thus more compatible with the gaseous fuels than are any of the aforementioned heavier organometallic compounds. With certain fuels synergistic effects can be obtained using a combination of tetramethyllead and a heavier, second organometallic compound such as methylcyclopentadienyl manganese tricarbonyl. In such cases the second organometallic compound is preferably included in the diesel fuel pilot charge.

Another advantage in using tetramethyllead is that because of its high volatility, it can be more easily carried into the combustion chamber with the gaseous fuels. With one system to handle, deliver, and meter a liquefied petroleum gas-additive mixture to the engine, the liquid LPG in which additive is dissolved is stored in a suitable container. Due to its own pressure the liquid is forced into a combination vaporizer and pressure regulator and there heated with engine coolant. The liquid is flashed and vaporized at a pressure slightly above atmospheric. The gaseous material is then metered and introduced into the combustion chamber. In such a system, if the combustion control additive is not of sufficient volatility, it will remain in the vaporizer as a liquid. Aside from the obvious disadvantage of not having the material reach the combustion chamber, maintenance and clean-up problems are posed. With a material such as tetramethyllead, tests have shown that the liquid temperature before flashing can be as low as 60° F. and still have essentially 100 percent vaporization of the tetramethyllead. Moreover, substantial vaporization of tetramethyllead takes place at temperatures well below 60° F. The compatibility of tetramethyllead with gaseous fuels is surprising in view of the wide differences between its volatility and that of the gaseous fuel. This is one additional feature which makes tetramethyllead extremely well suited as an additive to gaseous fuels.

The gaseous primary fuels useable in the method of this invention broadly include any material which is normally gaseous at ambient pressure and temperature and which is capable of being ignited in an internal combustion engine. This includes materials such as natural gas, well head gas, sewer gas, coal gas, water gas, producer gas, coke oven or blast furnace gas, liquefied petroleum gases and hydrocarbon gases. The preferred primary fuels are hydrocarbons containing from one to 4 carbon atoms including methane, ethane, ethylene, propane, propylene, butane, butylene, and mixtures thereof. A specific mixture of these light hydrocarbon gases, known as liquefied petroleum gas (L.P.G.) is also preferred. L.P.G. is mainly liquid propane, propylene, butane or mixtures thereof, sometimes containing trace quantities of ethane, isobutane, pentane and/or isopentane.

The primary fuel may also contain other additives. Typical of these are antioxidants, (e.g. N, N'-di-sec-butyl-p-phenylene diamine; p-N-butylaminophenol; 4-methyl-2,6-di-tert-butylphenol; 2,6-di-tert-butylphenol); metal deactivators (N,N' - disalicylidene - 1,2 - diaminopropane, etc.); dyes; phosphorus additives (e.g. tri-$\beta$-chloropropyl thionophosphate; dimethyltolyl phosphate; dimethylxylyl phosphate; phenyldimethylphosphate; tricresyl phosphate; trimethylphosphate, etc.); halohydrocarbon scavenging agents such as ethylene dibromide, ethylene dichloride, methyl bromide, methyl chloride, etc.

The diesel fuel base stocks used for the pilot injection fuel pursuant to the invention can be derived from a wide variety of crude sources. Furthermore, the diesel fuel may be made up of straight run diesel fuels, catalytically cracked stocks, No. 2 burner oils, light residual stocks and the like. These diesel fuels fall within the boiling range of from about 300 to 725° F., with intermediate fractions boiling at temperatures between these limits. The initial and final boiling points of the diesel fuels may vary to some extent from the above limits depending upon the grade of diesel fuel, its source, and its method of manufacture and formulation. Generally, any of the commercial-type available diesel fuels may be used as the pilot charge in the method of this invention. The cetane number may vary from about 30 to 65. In order to insure proper ignition, it is desirable that the diesel fuel have a cetane number of at least about 40.

The diesel fuels may also contain other additives such as stabilizers; stability-compatibility agents; cetane improvers such as alkyl nitrates (amyl nitrate); phosphate esters; corrosion inhibitors; metal deactivators; dyes; and the like. Amounts of these additives in the range of from about 0.001 to about 2 percent based on the weight of the diesel fuel are usually effective.

The relative amounts of diesel fuel pilot charge and primary fuel can vary over wide limits. A minimum amount of the diesel pilot charge will be required to provide continuous and efficient ignition of the total charge. This amount is usually at least 1 percent of the total fuel. While the pilot charge can be increased to about 50 percent or more of the total fuel, to obtain the maximum benefits of this invention the pilot charge should be less than 50 percent. A preferred range for the diesel pilot charge is from about 2 to about 10 percent of the total fuel charge at full load.

The fuel-air ratios for the practice of this invention are subject to wide variations. In the compression ignition cycle, air is not throttled but is set at a somewhat constant rate. Since power output is controlled by throttling the fuel, air-fuel ratios vary with power demand. Under idling conditions air-fuel ratio may be as high as 100:1, while under full load conditions the mixture may be considerably enriched so as to have air-fuel ratios as low as about 13:1. The optimum air-fuel ratios under full load are of the order of from about 17:1 to 14:1.

The compression ratios of the engines must be high enough to raise the temperature of the compressed air to a level so as to ignite the diesel fuel pilot charge. Thus the compression ratio should be at least about 12:1. Higher compression ratios may be used but at ratios higher than about 22:1 additional problems are presented. The engine must be designed so as to withstand extremely high temperatures and pressures, and the diesel fuel injection system must be capable of injection at these high pressures.

This invention is applicable to two-cycle and four-cycle diesel engine operation. In the two-cycle engine, the gaseous fuel is introduced into the combustion chamber after the scavenging operation has been completed. In other words, the gaseous fuel is introduced after the piston has covered the intake ports on its upward stroke and the exhaust valves (or exhaust ports) have been closed. During and after this introduction, the piston continues its upward stroke thereby compressing the air-gaseous fuel mixture.

At some point, usually before top dead center, the pilot injection of the diesel fuel is made and compression ignition initiated. In four-cycle engine operation, the gaseous fuel can be supplied to the air intake manifold or it can be introduced through a valve into the combustion chamber as in the case of the two-cycle engine.

The method of this invention and the benefits obtained therefrom are illustrated by the following examples.

EXAMPLE I

A Hercules diesel model DD-169-H; 16.2:1 compression ratio, four-cycle, 169 cubic inch direct injection engine was used in these tests. The engine was equipped with a Bosch variable injection timing fuel system. The engine was converted so as to be operable both as a full diesel and also on a dual fuel cycle. Provisions were made to allow the use of either L.P.G.-type fuels or natural gas as the primary fuel.

Provisions were made to detect loss of combustion control by use of a Kistler Model 601 pressure transducer in one cylinder of the engine. The same transducer was used for pressure-time trace display on a dual beam oscilloscope. The engine was coupled to a D.C. dynamometer and air consumption was measured by a smooth approach orifice head of a surge tank.

Engine speed was maintained at 1600 r.p.m., intake air temperature was ambient in the dynamometer room, and engine jacket temperature was controlled to 170° F. The engine was operated as a full diesel and also using a dual fuel cycle. Under a dual fuel operation, the amount of the diesel pilot charge was maintained constant about 1.65 lbs. of fuel per hour. Propane and natural gas containing and void of organometallic compounds were used as primary fuels. The obtainable brake horsepower, as limited by loss of combustion control, was measured.

The organometallic additive concentration in some instances will be expressed as grams of metal additive per therm (100,000 B.t.u.) of fuel. The use of this term is convenient for it provides a direct comparison of additive effectiveness in liquid and gaseous fuels and takes into account differences in heating value between certain gaseous and liquid fuels when compared on a volume basis. For orientation, one gram per gallon in propane is equal to about 1.2 grams per therm. Lower heating values were used for calculations. The heating value-mass relationship for the fuels is diesel fuel 18,450 B.t.u./lb.; propane 19,800 B.t.u./lb.; and natural gas 18,500 B.t.u./lb.

The propane used was technical grade with a minimum purity of 95 percent propane. The natural gas was composed of about 87 percent methane, 3.4 percent ethane, 7 percent nitrogen, 1 percent propane and trace amounts of butanes, pentanes, hexanes, carbon dioxide and helium. The diesel fuel used had an API gravity of 36.4 and a cetane number of 49.6.

The engine, when operated as a full diesel according to the manufacturer's specification, developed 34 horsepower at a diesel fuel consumption rate of 13.3 lbs./hour.

The engine was then operated on a dual fuel cycle using various primary fuel flow rates and a constant diesel pilot charge fuel rate of about 1.65. The quantity of the primary fuel metered into the combustion chamber was increased until combustion control was lost. This was evidenced by high frequency vibrations on the pressure-time trace or on a $dp/dt$ trace on an oscilloscope screen. It was also possible to detect combustion knock audibly. The horsepower developed for various operating conditions is shown in FIGURE I.

In the figure, the brake horsepower obtained with various primary fuels at the point where the engine was limited by loss of combustion control is plotted as the ordinate versus concentrations of organometallic compounds as the abscissa. The point A represents the available horsepower when operating as a full diesel according to the manufacturer's specifications. Curves B, C, and D show the available power when operating on a dual fuel cycle. Curve B shows the results of using natural gas containing various concentrations of tetramethyllead as the primary fuel. Curves C and D show the results of using propane containing various concentrations of tetramethyllead and tetraethyllead, respectively.

As shown by the figure, using unleaded natural gas as the primary fuel resulted in a power output essentially equal to full diesel operation. However, using propane the engine developed only 23 horsepower before it became knock limited. This represents only 68 percent of the power obtainable when the engine is operated as a full diesel.

By the addition of tetraethyllead or tetramethyllead to the primary fuel, combustion control was retained and much higher fuel rates and hence markedly increased power output were obtainable. The outstanding benefits obtained due to the addition of 3.5 grams of alkyllead compound per therm of primary fuel are shown in the following table.

TABLE III

*Increase in brake horsepower due to tetraalkyllead*

| Fuel | Knock Limited Brake Horsepower | Percent Increase Over unleaded Fuel |
| --- | --- | --- |
| Natural Gas (unleaded) | 33.8 | |
| Natural gas+3.5 grams [1] Pb/therm | 41.0 | 21.3 |
| Propane (unleaded) | 23.0 | |
| Propane+3.5 grams [1] Pb/therm | 36.3 | 58.0 |
| Propane+3.5 grams [2] Pb/therm | 34.9 | 52.0 |

[1] Pb added as tetramethyllead.
[2] Pb added as tetraethyllead.

NOTE.—Brake horsepower with full diesel operation equals 34.

The data of FIGURE I and Table III demonstrate that the organometallic compounds of this invention are very effective in increasing the allowable power of a compression ignition engine operated on a dual fuel cycle. When the engine is operated on a dual fuel cycle using unleaded propane as the primary fuel, only a fraction of the power is available as compared to operating as a full diesel. Since propane is the major constituent of L.P.G., a severe power penalty has heretofore been associated with the use of this material in a dual fuel application. However, by the use of the method of this invention it is now possible to use this widely available and relatively economical hydrocarbon in a dual fuel application without any loss in the available power. In fact at a moderate tetraalkyllead concentration, a dual fuel engine can be operated so as to develop more power than available under straight diesel operation. Thus, operating the engine as a full diesel, as recommended by the manufacturer, 34 horsepower was developed. Using unleaded propane as the primary fuel in a dual fuel cycle, the engine developed 23 horsepower—only 68 percent of that available as a straight diesel. However, the addition of 3.5 grams of lead per therm of propane permitted the engine to develop more power than available when operating as a full diesel. The use of tetramethyllead, the most preferred additive of this invention, resulted in a 58 percent power gain over that obtainable when using unleaded propane as the primary fuel. This value also represents a 6.8 percent power gain over that obtainable when operating as a straight diesel.

The use of small amounts of tetramethyllead in natural gas permitted more power to be developed using the dual fuel cycle than obtainable with full diesel operation. At a higher tetramethyllead concentration of 4.5 grams of lead per therm of natural gas, the engine operating on a dual fuel cycle, developed 43.2 brake horsepower without loss of combustion control. This represents a 24 percent improvement over the 34 horsepower obtainable when operating as a full diesel, and a 25 percent improvement as compared to dual fuel operation using unleaded natural gas. Thus by the use of the method of this invention not only can a cheaper fuel be used, but the available engine power is markedly improved.

As shown in the above Table III, propane containing tetramethyllead allows greater power to be developed than the same fuel containing tetraethyllead. Another advantage in using tetramethyllead is that because of its high volatility it is more easily vaporized into, and more compatible with, the gaseous fuel. For these reasons the use of tetramethyllead in the primary fuel in a dual fuel operation constitutes a most preferred embodiment of this invention.

EXAMPLE II

In this example the engine was operated as in Example I, but the primary fuel was propane containing 0.0, 1.2, and 3.6 grams of lead as tetramethyllead or tetraethyllead per therm, mixed with 40 and 60 weight percent of natural gas. The measured available horsepower and the percent increase due to the addition of the tetraalkyllead compound are shown in Table IV.

TABLE IV

*Increase in brake horsepower due to tetraalkyllead*

| Fuel | Grams Pb/ therm of propane | Brake horsepower | Percent Increase over unleaded fuel |
| --- | --- | --- | --- |
| 40 Wt. percent natural gas + 60 Wt. percent propane. | 0.0 | 25.0 | |
| Do | 1.2 as TEL | 30.8 | 23.2 |
| Do | 1.2 as TML | 32.3 | 29.2 |
| Do | 3.6 as TEL | 35.0 | 40.0 |
| Do | 3.6 as TML | 35.6 | 42.5 |
| 60 Wt percent natural gas + 40 Wt percent propane. | 0.0 | 28.0 | |
| Do | 1.2 as TEL | 31.6 | 12.9 |
| Do | 1.2 as TML | 32.6 | 16.4 |
| Do | 3.6 as TEL | 34.8 | 24.3 |
| Do | 3.6 as TML | 35.2 | 25.7 |

NOTE.—Brake horsepower with full diesel operation equals 34.

The data of Table IV, consistent with those of the previous example, show that by using a moderate amount of a tetraalkyllead compound, mixtures of propane and natural gas can be effectively used in a dual fuel cycle without sacrifice in available power. In fact, increasing the concentration of the tetraalkyllead compound allows the dual fuel engine to develop greater power than that possible with straight diesel operation. These data also show that with natural gas-propane mixtures, TML is superior to TEL.

EXAMPLE III

A dual fuel engine was operated in accordance with the procedure of Example I. A pilot fuel injection rate of 1.8 pounds of diesel fuel per hour was used. The engine was operated on a dual fuel cycle using unleaded and leaded propane as the primary fuel and diesel fuel with and without manganese as methylcyclopentadienyl manganese tricarbonyl in the pilot charge. For the various fuel-additive combinations, the power output as limited by loss of combustion control was determined and is shown in Table V.

TABLE V

*Effect of including a combustion control additive in both the primary fuel and diesel pilot charge*

| Grams of Pb/ gal. of primary fuel [1] | Grams of Mn/ gal. of diesel pilot charge [2] | Available brake horsepower | Power increase due to combustion control additive | |
|---|---|---|---|---|
| | | | Horsepower | Percent |
| 0 | 0 | 22.4 | -------- | -------- |
| 0 | 0.6 | 22.4 | 0 | 0 |
| 0 | 6.0 | 25.3 | 2.9 | 13.0 |
| 1.05 | 0 | 30.4 | 8.0 | 35.7 |
| 3.15 | 0.0 | 32.0 | 9.6 | 42.9 |
| 3.15 | 0.6 | 33.9 | 11.5 | 51.5 |
| 3.15 | 6.0 | 37.1 | 14.7 | 65.5 |

[1] Pb added as tetramethyllead.
[2] Mn added as methylcyclopentadienyl manganese tricarbonyl.

As shown by the above data, available power can be increased by including a combustion control additive to either the primary fuel or the pilot diesel charge. However, much more efficient results are obtained by including the additive in the primary fuel charge. As shown in the above table, when 6.0 grams of manganese were added to the pilot charge, power was improved by about 13 percent. This amount of manganese is roughly equivalent to just over 1 gram of metal per gallon of primary fuel. As shown in the table, 1.05 grams of lead added to the primary fuel increased horsepower by about 35 percent. Thus in the efficient utilization of the method of this invention, a combustion control additive must be included in the primary charge.

The above data demonstrate that synergistic effects can be obtained by including an alkyllead compound in the primary gaseous fuel and adding a manganese compound to the pilot charge. The benefits thus obtained are greater than the sum of the improvements due to using manganese solely in the pilot charge and using the alkyllead solely in the primary fuel. For example, using 6 grams of manganese per gallon of pilot charge increased the available power by 2.9 horsepower, whereas using 3.15 grams of lead per gallon of primary fuel increased power by 9.6 horsepower. It would be expected that using these additives in the respective fuels concurrently would increase power by 12.5 horsepower, the sum of their individual effects. However, as shown, power was actually increased by 14.7 horsepower—about 18 percent more improvement than would have been expected.

EXAMPLE IV

The compression ignition engine is operated in accordance with the procedure of Example I using commercial liquefied petroleum gas (L.P.G.) as the primary fuel and a commercial diesel fuel having a cetane number of 40 as the pilot charge. The L.P.G. is composed of 53 percent propylene, and 46 percent propane, the remainder being essentially trace amounts of ethane, butane and pentane. Operating on a dual fuel cycle, the available power, as limited by loss of combustion control, is only a fraction of that obtainable when operating as a full diesel. The engine is then operated on a dual fuel cycle using L.P.G. to which has been added 2.8 grams of lead per gallon as tetramethyllead. Under full load conditions, the pilot charge rate is such that the weight ratio of diesel fuel pilot charge to gaseous primary fuel is 0.015:1. The available power under these conditions is markedly increased and is essentially equal to that obtained when operating as a full diesel.

EXAMPLE V

The procedure of Example IV is repeated but combustion control additives are added to both the primary fuel and to the diesel pilot charge. Thus operating on a dual fuel cycle using L.P.G. 3.0 grams of lead per gallon as the primary fuel, and diesel fuel containing 1.0 grams of iron per gallon as dicyclopentadienyl iron, the available power is greater than that obtained when operating as a full diesel.

EXAMPLE VI

The dual fuel engine of Example I is operated using L.P.G. containing 0.5 weight percent lead as tetramethyllead as the primary fuel and a 45 cetane number diesel fuel containing 0.5 weight percent nickel as nickel carbonyl. Under full load conditions, the weight ratio of diesel fuel pilot charge to primary gaseous fuel is about 1:4. A significant increase in available power is obtained as compared to operating the engine on a dual fuel cycle without the use of combustion control additives.

Further primary fuel and diesel pilot charge fuels are illustrated in the following examples in Table VI.

Some of the preferred liquefied petroleum gas compositions are shown in the examples of Table VII. In some instances, the fuels also contain a halohydrocarbon scavenging agent. A theory of this material is defined as the theoretical amount required to react with all the lead present to form lead halide.

TABLE VI

*Primary gaseous fuels and diesel pilot charge fuels for dual fuel operation*

| Example | Primary fuel composition, Vol. percent | Additive, Wt. Percent Metal in Primary Fuel | Diesel Fuel Pilot Charge Cetane No. | Additive, Wt. Percent Metal in Diesel Fuel |
|---|---|---|---|---|
| VII | 75 Propane, 25 Butane | 0.5 as Tetramethyllead | 50 | 0.01 as methylcyclopentadienyl manganese tricarbonyl. |
| VIII | 50 Propane, 40 Butane, 10 Propylene | 0.04 as cyclopentadienyl nickel nitrosyl | 60 | 0.02 as cyclopentadienyl cobalt dicarbonyl. |
| IX | 70 Methane, 20 Ethane, 10 Ethylene | 0.001 as Dimethyldiethyllead, 0.001 as trimethylethyllead. | 33 | 0.15 as dicyclopentadienyl iron. |
| X | 55 Propane, 25 Butane, 20 Propylene | 0.05 as Tetraethyllead, 0.025 as Dimethyldiethyllead 0.025 as Trimethylethyllead 0.10 as Tetramethyllead. | 30 | 0.2 as cyclopentadienyl manganese tricarbonyl. |
| XI | 90 Butane, 10 Propylene | 0.3 as Dicyclopentadienyl iron | 42 | 0.1 as tetrabutyllead. |
| XII | 30 Propane, 30 Propylene, 40 Butane | 0.2 as Cobalt carbonyl | 48 | 0.4 methylcycolpentadienyl nickel nitrosyl. |

TABLE VII
Primary fuel compositions

| Example | LP gas comp. volume 0/0 | Lead, gm./gal. | Scavenger, theories |
|---|---|---|---|
| XIII | 100 Propane | 3.0 as tetraethyllead | |
| XIV | 75 Propane, 25 Butane | 0.1 as tetraethyllead | |
| XV | 30 Propane, 70 Butane | 1.5 as tetraethyllead, 1.5 as tetramethyllead. | |
| XVI | 50 Propane, 40 Butane, 10 Propylene | 1.0 as tetraethyllead | 0.5 as methyl bromide, 1.0 as methyl chloride. |
| XVII | 25 Propane, 50 Butane, 25 Propylene | 3.5 as tetraethyllead | 0.5 as ethylene dibromide, 1.0 as ethylene dichloride. |
| XVIII | 60 Butane, 40 Propylene | 4.5 as tetraethyllead | 0.75 as ethylene dibromide, 1.50 as ethylene dichloride. |
| XIX | 90 Butane, 10 Propylene | 6.0 as tetraethyllead | 0.5 as methyl bromide, 1.0 as methyl chloride. |
| XX | 75 Propane, 25 Butane | 0.25 as tetraethyllead, 0.75 as tetramethyllead. | |
| XXI | 50 Propane, 40 Butane, 10 Propylene | 0.75 as tetraethyllead, 0.25 as tetramethyllead. | 0.5 as methyl bromide, 1.0 as methyl chloride. |
| XXII | 55 Propane, 45 Butane | 1.5 as tetraethyllead, 1.0 as methyltriethyllead. | 1.0 as methyl chloride. |
| XXIII | 25 Propane, 50 Butane, 25 Propylene | 1.0 as tetraethyllead, 2.5 as dimethyldiethyllead. | 0.5 as ethylene dibromide, 1.0 as ethylene dichloride. |
| XXIV | 60 Butane, 40 Propylene | 2.5 as tetraethyllead, 2.0 as trimethylethyllead. | 0.75 as ethylene dibromide, 1.50 as ethylene dichloride. |
| XXV | 60 Propane, 20 Butane, 20 Propylene | 0.5 as tetraethyllead, 0.5 as dimethyldiethyllead, 0.5 as tetramethyllead. | 1.0 as ethylene dichloride. |
| XXVI | 30 Propane, 50 Butane, 20 Propylene | 1.5 as tetraethyllead, 1.0 as methyltriethyllead, 1.5 as tetramethyllead. | 0.1 as ethylene dibromide, 0.2 as ethylene dichloride. |
| XXVII | 30 Propane, 30 Butane, 40 Propylene | 2.0 as tetraethyllead, 1.5 as trimethylethyllead, 1.0 as tetramethyllead. | 1.0 as ethylene dibromide, 1.5 as ethylene dichloride. |
| XXVIII | 60 Propane, 40 Butane | 1.0 as tetraethyllead, 0.5 as methyltriethyllead, 0.7 as dimethyldiethyllead. | 0.5 as methyl bromide, 1.0 as methyl chloride. |
| XXIX | 55 Propane, 45 Butane | 1.0 as tetraethyllead, 0.5 as methyltriethyllead, 0.7 as dimethyldiethyllead, 1.0 as tetramethyllead. | 0.5 as methyl bromide, 1.0 as methyl chloride. |
| XXX | 55 Propane, 25 Butane, 20 Propylene | 1.0 as tetraethyllead, 0.5 as dimethyldiethyllead, 0.5 as trimethylethyllead, 2.0 as tetramethyllead. | 0.5 as ethylene dibromide, 1.5 as ethylene dichloride. |
| XXXI | 100 Propane | 3.0 as tetramethyllead | |
| XXXII | 70 Propane, 30 Butane | 3.0 as tetramethyllead | |

A variety of methods are available to deliver the combustion control additive into the combustion chamber. The specific technique will vary depending upon the physical state of the primary fuel. In the practice of this invention the primary fuel may be stored in either a liquid or gaseous state. Higher boiling fuels such as mixtures comprising a major portion of propane and containing smaller amounts of pentane, butane, ethane, and methane may be stored under pressure in a liquid state. Lighter hydrocarbons such as natural gas, ethane, and methane are normally stored under pressure in a gaseous state.

When using fuel stored as a liquid such as L.P.G., the antiknock material may be simply added to the fuel in its liquid state. Due to its own pressure, the liquid fuel is forced from the storage tank into a combination vaporizer and regulator where, along with the combustion control additive, it is vaporized. External heat from the engine coolant may be used to insure complete vaporization of the fuel-additive mixture. The evaporated mixture, along with air, is then metered into the manifold and inducted into the combustion chamber by conventional means.

When the primary fuel is stored in the gaseous state, a small amount of liquid propane or L.P.G. may be used to carry the metal additive into the intake manifold or directly into the combustion chamber. A mixture of from about 3 to 90 percent combustion control additive in propane may be delivered into the vaporizer-regulator section as described above, and the evaporated mixture then mixed with the primary gaseous fuel prior to introduction into the intake manifold. Alternatively, the vaporized additive-propane mixture may be delivered directly into the combustion chamber and there mixed with the primary fuel.

The carburetor principle commonly used in gasoline engines may also be utilized to introduce the combustion control additive into a gaseous fuel stream. The gaseous primary fuel passes through the venturi portion and the additive is metered in from the float chamber through jets. Still another method is direct injection of the additive into the combustion chamber similar to that used to inject diesel fuel. The additive may be injected in a pure state or diluted in a liquid fuel such as L.P.G. or propane. Still another method contemplates the use of equipment similar to that used in continuous flow manifold injection systems used for injection of gasoline into the air supply for automotive-type fuel injection systems.

The additive may also be carried into the combustion chamber with the air stream. However, since in many two-cycle and supercharged engines air is used to scavenge the cylinders of residual products, a portion of the additive would be lost with the scavenged products. In most situations it is preferable to introduce the additive into the combustion chamber via the primary, gaseous fuel stream.

It is also possible to use more elaborate equipment to meter in only the amount of the additive required to retain combustion control. During start-up and under low-power requirements, only minor amounts, or in some cases, no additive will be required. At higher power demands where primary fuel rate is increased, the concentration of the combustion control additive may be increased so as to retain combustion control. Metering controls to proportion additive flow rate to primary flow at predetermined ratios may be utilized, or pressure detectors may be used to increase the amount of the additive when abnormal combustion is approached.

Methods for the preparation of the foregoing metal compounds have appeared in the literature. Thus, the preparation of lead alkyls by the alkylation of sodium-lead alloys is described in such patents as U.S. 2,635,107. A way of preparing manganese pentacarbonyl is described in U.S. Patent 2,822,247. The preparation of the other simple metallic carbonyls is so well known as to be matters of common knowledge in the chemical arts. References to the preparation of the simple cyclopentadienyl metal compounds are given in Rochow et al., "The Chemistry of Organometallic Compounds," John Wiley and Sons, Inc., New York, 1957. Preparation of the mixed cyclopentadienyl-carbonyl compounds, including the preferred cyclopentadienyl manganese tricarbonyls, is described in U.S. Patents 2,818,416 and 2,818,417. The olefinically coordinated iron tricarbonyls are made as described by Reihlen et al., "Annalen der Chemie," vol. 482, pages 161–182.

I claim:
1. A method of operating a compression ignition engine which comprises the steps of:
   (1) introducing into the combustion chamber of a compression ignition engine a combustible mixture which comprises a gaseous fuel, an organometallic combustion control additive and air,
   (2) compressing said mixture to from about 1/12 to about 1/22 of its original volume so as to raise the temperature of said mixture to a level sufficient to ignite diesel fuel,
   (3) injecting into the combustion chamber a pilot charge of diesel fuel so as to initiate combustion of the total mixture, the weight ratio of said pilot charge to said gaseous fuel being from about 0.01:1 to about 1:1;
said organometallic additive being selected from the group consisting of tetraalkyllead compounds containing from one to about 6 carbon atoms in each alkyl group, and organic compounds of a metal having an atomic number of from 25–28, said organic compounds characterized by being hydrocarbon-soluble, by being covalent, by possessing in addition to said metal only elements selected from the group consisting of carbon, oxygen, hydrogen and nitrogen, by containing at least one group selected from the class consisting of cyclopentadienyl groups and the carbonyl group, and by containing from about 5 to 20 carbon atoms in the molecule; said organometallic additive being present in an amount such that the concentration of metal of said organometallic additive is from 0.001 to about 0.5 weight percent based on the weight of said gaseous fuel.

2. The method of claim 1 wherein said pilot charge of diesel fuel is characterized by containing from 0.001 to about 0.5 weight percent of metal as said combustion control additive.

3. The method of claim 1 wherein said organometallic combustion control additive is a tetraalkyllead compound having alkyl groups containing up to about 6 carbon atoms and said pilot charge of diesel fuel being characterized by containing from about 0.001 to about 0.5 weight percent of a metal as a compound selected from the group consisting of organic compounds of a metal having an atomic number of from 25–28, said compounds characterized by being hydrocarbon soluble, by being covalent, by possessing in addition to said metal only elements selected from the group consisting of carbon, oxygen, hydrogen and nitrogen, by containing at least one group selected from the class consisting of cyclopentadienyl groups and the carbonyl group and by containing from about 5 to 20 carbon atoms in the molecule.

4. The method of claim 1 wherein said organometallic combustion control additive is tetramethyllead and said pilot charge of diesel fuel is characterized by containing from about 0.001 to 0.5 weight percent of manganese as a cyclopentadienyl manganese tricarbonyl compound.

5. The method of claim 1 wherein said gaseous fuel is propane and said organometallic combustion control additive is tetramethyllead, the weight ratio of said gaseous fuel to air under full load conditions being from about 1:14 to 1:17.

6. The method of claim 4 wherein said manganese compound is methylcyclopentadienyl manganese tricarbonyl.

References Cited by the Examiner
UNITED STATES PATENTS

| | | | |
|---|---|---|---|
| 673,160 | 4/01 | Diesel | 123—27 |
| 2,818,416 | 12/57 | Brown et al. | 123—1 |
| 2,818,417 | 12/57 | Brown et al. | 123—1 |
| 2,965,085 | 12/60 | Kohler | 123—119 |

RICHARD B. WILKINSON, *Primary Examiner.*